US 6,626,340 B1

(12) United States Patent
Burgess

(10) Patent No.: US 6,626,340 B1
(45) Date of Patent: Sep. 30, 2003

(54) LOAD CARRIER

(76) Inventor: Ronald J. Burgess, 469 Mitchell St., Parowan, UT (US) 84761

( * ) Notice: Subject to any disclaimer, the term of this patent is extended or adjusted under 35 U.S.C. 154(b) by 0 days.

(21) Appl. No.: 09/097,310

(22) Filed: Jun. 12, 1998

Related U.S. Application Data

(60) Provisional application No. 60/050,079, filed on Jun. 13, 1997.

(51) Int. Cl.$^7$ .................................................. B60R 9/10
(52) U.S. Cl. ...................... 224/536; 224/323; 224/324; 224/537; 224/924; 224/571; 224/570
(58) Field of Search ................................ 224/924, 324, 224/521, 536, 537, 533, 522, 323, 405, 558, 570, 571

(56) References Cited

U.S. PATENT DOCUMENTS

| 1,826,893 | A | * | 10/1931 | Larsen | ..................... 224/405 X |
| 2,415,286 | A | * | 2/1947 | Hyde | ........................... 224/536 |
| 2,434,826 | A | * | 1/1948 | Wubben | ...................... 224/323 |
| 2,554,650 | A | * | 5/1951 | Waite | .......................... 224/323 |
| 3,529,737 | A | | 9/1970 | Daugherty | |
| 3,591,029 | A | | 7/1971 | Coffey | |
| 3,731,830 | A | | 5/1973 | Long | |
| 3,877,622 | A | | 4/1975 | McLain | |
| 3,891,132 | A | | 6/1975 | Chandler | |
| 4,189,274 | A | | 2/1980 | Shaffer | ....................... 414/462 |
| 5,025,932 | A | | 6/1991 | Jay | .............................. 211/20 |
| 5,330,084 | A | | 7/1994 | Peters | |
| 5,445,300 | A | | 8/1995 | Eipper et al. | ................ 224/496 |
| 5,495,970 | A | | 3/1996 | Pedrini | ......................... 224/314 |
| 5,558,261 | A | | 9/1996 | Hedeen | ....................... 224/511 |
| 5,820,002 | A | | 10/1998 | Allen | |
| 5,947,357 | A | * | 9/1999 | Surkin | ......................... 224/924 |

FOREIGN PATENT DOCUMENTS

| DE | 3217319 | 5/1982 |
| DE | 4338759 | 11/1993 |
| DE | 4441832 | 11/1994 |
| EP | 0141757 | 7/1984 |
| FR | 2377317 | 1/1977 |
| FR | 2411109 | 12/1977 |
| FR | 2744683 | 2/1996 |

OTHER PUBLICATIONS

"Thule rear–mounts", 1994, 2 pages, Thule Sweden catalog.
"Access Sports Rack", 1996, 2 pages, Softride Bicycles & Bicycles Suspension Systems catalog.
"Badger Bicycle Rack", 1998, 2 pages, Badger Cycling Accessories brochure.

* cited by examiner

Primary Examiner—Gregory M. Vidovich
(74) Attorney, Agent, or Firm—Royston, Rayzor, Vickery, Novak & Druce, L.L.P.

(57) ABSTRACT

A load carrier for a bicycle including a load carrier frame adapted to be mounted to a transport vehicle. A bicycle support is carried upon the load carrier frame and is configured for engaging a bicycle at a position proximate a rotatable connection of a bicycle pedal crank assembly to a frame of the bicycle. A securement mechanism is coupled to the load carrier frame and adapted for releasably-engaging the bicycle pedal crank assembly of the bicycle for securing the bicycle upon the load carrier frame. In one version of the load carrier, the securement mechanism is a substantially J-shaped hook securable about the bicycle pedal crank assembly. The J-shaped hook being of conventional design, it includes a hooked end portion and a straight end portion. A biasing member may be optionally associated with the J-shaped hook for urging the hooked end portion toward the load carrier when a bicycle is being transported upon the load carrier. In an alternative version of the load carrier, the securement mechanism is a clamping mechanism pivotally connected upon the load carrier frame. The clamping mechanism is abuttable against a properly positioned bicycle pedal crank assembly of a bicycle to be secured upon the load carrier.

16 Claims, 6 Drawing Sheets

LOAD CARRIER

RELATED PATENT APPLICATIONS

This patent application claims the benefit of U.S. Provisional Application No. 60/050,079 filed Jun. 13, 1997 entitled LOAD CARRIER.

INCORPORATION BY REFERENCE

The entire disclosures, including the drawings of U.S. Pat. No. 5,529,231 issued Jun. 25, 1996 to Ronald J. Burgess for an ADJUSTABLE CAR CARRIER, U.S. Pat. No. 5,647,521 issued Jul. 15, 1997 to Ronald J. Burgess for an ADJUSTABLE CAR CARRIER, U.S. patent application Ser. No. 08/892,542 filed Jul. 14, 1997 entitled AN EXTENSION FOR A CAR CARRIER, and Provisional Patent Application filed Jun. 13, 1997 for a LOAD CARRIER and assigned Ser. No. 60/050,079 are expressly incorporated by reference herein for disclosure purposes.

FIELD OF THE INVENTION

The present invention and its several constituent components relate to vehicular load carrying apparatus. More specifically, the primary embodiments of the presently disclosed invention relate to hitch-mounted load carrying apparatus for sports equipment. Several significant components of the invention, however, have shared applicability with load carrying apparatus positioned at alternative locations upon a vehicle such as upon the roof top.

BACKGROUND OF THE INVENTION

Carriers for sporting equipment are well known in the industry and are used for transporting pieces of sport equipment to remote locations for use. One such instance is carriers for bicycles that mount upon passenger vehicles. A preferred location for mounting such racks is at the rear of the vehicle where the rack causes minimum distraction and does not obstruct a driver's view. Many vehicles have tailgates that lower and back windows that raise; examples of such vehicles are station wagons, pick-up trucks and many sport utility vehicles. It is also common for such vehicles to have trailer hitch receptacles or receivers located proximate to the bumper structure below these gates. A common configuration for such receivers is a rectangular receptacle intended for a balled assembly to be inserted and fixed therein. It is upon this balled assembly that a trailer may be hitched. When such a balled assembly is not needed, it may be removed in many designs. When removed, the rectangular or otherwise tubularly shaped receiver is vacant and often covered with a removable cap.

Sport rack carrier designers have taken advantage of the presence of such a receiver and designed sports racks to be mounted therein at times when the vehicle is not being used for towing purposes and the receiver is vacant. One particularly popular embodiment in such a rack is in the form of a bicycle carrier.

Such hitch mounted bicycle carriers are known in the industry. One example is found in U.S. Pat. No. 5,529,231 issued to Burgess on Jun. 25, 1996 for an ADJUSTABLE CAR CARRIER. In that device, an upright post is journalled to a horizontal extension mounted in the hitch receiver. Typical carrier systems of known designs incorporate a hinged configuration so that the primary upright structure may be folded downward to facilitate the opening and closing of an adjacently located tailgate or door. During transport and travel, however, the carrier must be fixed in a substantially upright orientation for proper carriage of the sports equipment resting thereon.

An obvious benefit of such hitch mounted carriers is that they do not compromise the interior carrying capacity of the vehicles upon which they are mounted. Because of the extension effect behind the vehicle, however, loads carried thereon may experience amplified movement as well as shock forces. As a result, it has been recognized as an important criteria for such carrier systems to have efficient securing systems for the load intended to be carried thereon.

In the illustrated embodiments of the present invention, those loads are shown as bicycles. Through the use of other known hitch mount carriers for bicycles, the inventors have appreciated a need for adaptable configurations for securely receiving the bicycles upon the carrier. Adaptability has also been recognized as important for accommodating various bicycles' configurations when mounted thereon. Still further, it has been appreciated that at different times an operator may desire to carry different numbers of bicycles on a carrier. As has been exemplified in the art, carriers may be adaptably constructed to carry two or more bicycles at a given time.

In view of these criteria and needs of the industry and consumer, the present invention has been developed and designed to provide suitable enhancements for such load carrier apparatus.

SUMMARY OF THE INVENTION

This invention includes features and/or components that have been invented and selected for their individual and combined benefits and superior performance as a load carrier. The system includes multiple components that individually and singularly have new and novel features in and of themselves. Each of the individual components, however, work in association with, and are optimally mated to the others to perform superiorly as a hitch mounted load carrier.

In a preferred embodiment, the present invention takes the form of a load carrier for at least one bicycle. The carrier includes a load carrier frame adapted to be mounted to a transport vehicle. A bicycle support is carried upon the load carrier frame and is configured for engaging a bicycle at a position proximate a rotatable connection of a bicycle pedal crank assembly to a frame of the bicycle. A securement mechanism is coupled to the load carrier frame and adapted for releasably engaging the bicycle pedal crank assembly of the bicycle for securing the bicycle upon the load carrier frame.

In one version of the load carrier, the securement mechanism is a substantially J-shaped hook securable about the bicycle pedal crank assembly. The J-shaped hook being of conventional design, it includes a hooked end portion and a straight end portion. A biasing member may be optionally associated with the J-shaped hook for urging the hooked end portion toward the load carrier when a bicycle is being transported upon the load carrier. In an alternative version of the load carrier, the securement mechanism is a clamping mechanism pivotally connected upon the load carrier frame. The clamping mechanism is abuttable against a properly positioned bicycle pedal crank assembly of a bicycle to be secured upon the load carrier.

Another embodiment of the present invention is a method for achieving the benefits afforded through the utilization of the above described load carrier design. This method for transporting a bicycle includes mounting a load carrier upon a transport vehicle. One or more bicycles are then installed upon a bicycle support member of the load carrier by engaging the bicycle at a position proximate a rotatable connection of a bicycle pedal crank assembly to a bicycle frame of the bicycle. The bicycle is releasably secured to the load carrier utilizing a securement mechanism coupled to the load carrier by restraining the bicycle pedal crank assembly of the bicycle to the load carrier.

The more general characteristics of the load carrier design of the present invention is comprised of two primary components. A lower or base portion is adapted to be insertably received into the carrying vehicle's tubular hitch mount. This base or mounting portion is constructed in a substantially inverted "T" design. The upright member of the "T" is either open-ended at its top or provided with another type of receiver or connection for accepting a second primary component in the form of a head piece to be mounted securely thereon. By incorporating the two piece construction between the lower base portion and the exchangeable head pieces, a high degree of versatility is imparted to the invention.

While it is expected that the primary use of the carrier will be for sport equipment transport, by providing alternative head pieces, any number of applications may be accommodated. At least three substantially different types of head pieces are disclosed herein. The first, which includes at least two preferred embodiments, is for accommodating a plurality of bicycles to be carried thereon. The second configuration accommodates and accepts a containerized cargo compartment such as a luggage carrier box. The third configuration is a variably orientable clamping mechanism useable for holding items such as bicycles for maintenance and repair purposes. These alternatives are intended to be merely illustrative of the myriad of possible combinations that may be affected because of the advantageous component design disclosed herein.

A gas strut is employed upon the lower base portion to control movement of the upright or vertical member that is pivotally connected to the lowermost horizontal member of the T-shaped component. As may be easily appreciated, the upright member of the load carrier is connected to facilitate backward pivotation away from the carrying vehicle to accommodate the lowering of tailgates and provide greater clearance and accessibility to the rear portion of the carrying vehicle. Though a rearward positioning and orientation of the gas strut behind the upright member and away from the carrying vehicle has been illustrated, this configuration is not considered to be critical to performance. What is important is that the gas strut provide resistance to the folding down motion of the upright member with an urging force tending to keep the upright member in a substantially vertical position. Alternatively, the gas strut may be configured so that it merely applies resistance that ultimately gives way to the downward folding motion of the upright member. This type of gas strut may be utilized for preventing the upright member from too quickly folding downward and jostling the carried cargo which in the illustrated instances will be bicycles.

Two alternative embodiments of bicycle carrying head pieces are illustrated herein. In the first and preferred embodiment the portion of the carrier that supports the bicycle is provided through an upright open sleeve. The sleeve receives the bicycle pedal crank of one of the bicycle's pedal assemblies and abuttingly engages the lower portion of the bicycle frame where the bicycle pedal crank assembly connects. Alternatively, the bicycle's resting point may be at the rotateable axle between the pedal crank arm and the bicycle frame. Because the portions of the bicycle normally to be engaged are cylindrically shaped at the point of engagement with the carrier's support member, the top portion of the upright sleeve intended for such contact with the bicycle is designed to include a recess taking the form of an inwardly arc-shaped receiving and abutting lip. Different means are provided for securing the bicycle to the carrier in each of the two embodiments. Both designs provide an engagement member that prevents the bicycle from being inadvertently disengaged from the carrier.

Because the bicycle carrying head piece is designed to engage a lower portion of the bicycle, its design is advantageously low-rise. That is to say, the compact construction and low-rise characteristics of the carrier minimize its obtrusiveness to the overall structure of the carrying vehicle.

By securely supporting the bicycle at this lower extremity, only a single additional point of support is required for accomplishing two-point stability. Such a configuration is provided in one embodiment, where an adjustable tray is provided for the front tire of the bicycle. Through this two-point connection, no additional connections are required. Supplementally, an adjustable tray or receiver may be additionally provided for the rear wheel of the bicycle. Such an alternative bracing configuration should be viewed as an enhancement, but not a requirement of the present invention.

As described above, two different and exemplary means are illustrated for securing a connection between the carrier and bicycle. A most simplified connection is where a J-hook is secured about the bicycle pedal crank assembly of the bicycle for holding the bicycle down upon the carrier. This type of connection provides substantial benefit not only in its simplicity of construction, but also in its ease of use and ready adaptability to almost any bicycle design.

While the J-hook style connection is illustratively utilized on a hitch mount carrier, it is contemplated that such a connector may be utilized in any number of sport rack carrier configurations, also including roof mount carrier systems. It is important that the receiving lip of the upright bicycle support of the load carrying head piece be securely engaged upon the lower surface of the bicycle frame or upon a portion of the bicycle pedal crank assembly. The J-hook securement alone capably secures the bicycle in such an initial configuration. But, if the supporting lip slips from this originally supported position into a crevice of the bicycle's structure, such as the gap space between the frame and crank arm, the connection between the load carrier and bicycle may be compromised. As a result, attention should be given to the initial positioning of the bicycle during the mounting procedure, but furthermore, an elastic or biasing element may be included in the J-hook assembly as a take-up member. This elastic member compensates for any such change in configuration between the bicycle and the carrier so that slack occurring after the original mounting of the bicycle to the load carrier is taken up by the elastic member. An example, would be a spring or other biasing device interconnected between a stop or knob member upon the straight end portion of the J-hook and the load carrier for taking up such slack and maintaining a secure connection between the bicycle and the load carrier.

An alternative means for connecting the bicycle to the carrier head piece is also provided. Therein, a pivotal clamping mechanism is permitted to pivot in and out of closed engagement about a bicycle crank arm positioned in the upright open sleeve. By closing the clamp and tightening it so that it abuts and presses against the pedal crank arm with pressure, a satisfactory mounting connection is achieved between the bicycle and load carrier. As a practical matter, buffering inserts have been optionally provided inside the sleeve and also may be included upon the clamping piece so as to prevent damage to the crank arm when securing pressure is applied. These same buffering inserts may be used as spacers for properly positioning the bicycle pedal crank assembly within the sleeve. In other respects, however, the upright sleeves and those sleeves' orientations upon the carrier headpiece are similar.

Additionally, it is contemplated that an additional bicycle carrying head piece may be added as an extension to the primary head piece carried atop the mounting or base portion of the carrier. For example, a rearmost end cap of the horizontal tubular support member may be removed and an insertable portion of a similarly configured extension head piece received therein. The configuration of this extension member would be substantially similar to that of the bicycle carrying head piece described. The extension may be constructed to carry one or more bicycles thereby increasing the capacity of the load carrier. A typical load configuration is for consecutive bicycles to be oppositely mounted on the head piece so that the front wheel of one bicycle is next to the rear wheel of an adjacent bicycle.

As described, the lower or mounting portion of the carrier is constructed to receive differently configured head pieces. An example of such a different head piece is where a clamping mechanism has been engaged upon the mounting portion for securing an item requiring attention. It is anticipated that based on the variable designs, both horizontally and vertically oriented elongate components may be secured within the clamp. The need for such an assisting apparatus for bicycle maintenance procedures while away from repair facilities would be highly advantageous in remote locations. With the mounting portion being carried upon the vehicle, the easy exchange and provision of the clamping head facilitates required repairs when away from a shop. Such an advantageously configured clamping mechanism may also find utility even in a shop setting because of its ease of use and storability, not requiring a permanent position within the shop environment.

Many of the beneficial features of the several embodiments of the present invention have been described herein. Because the several pieces are constructed as components they may be assembled in variable combinations or at least provided in variably configurable systems that would be advantageous to the owner of sport equipment, especially those who own one or more bicycles and desire to transport them on their vehicles between ride locations. Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated to show details of particular components. Therefore, specific structural and functional details disclosed herein are not to be interpreted as limiting, but merely as a basis for claims that may be made and as a representative basis for teaching one skilled in the art to variously employ the present invention.

Certain terminology will be used in the following description for convenience and reference only and not for purposes of limitation. Elements may be recited as being "coupled"; this terminology's use anticipates elements being connected together in such a way that there may be other components interstitially located between the specified elements, and that the elements may be connected in fixed or movable relation to one another.

Figure 3:
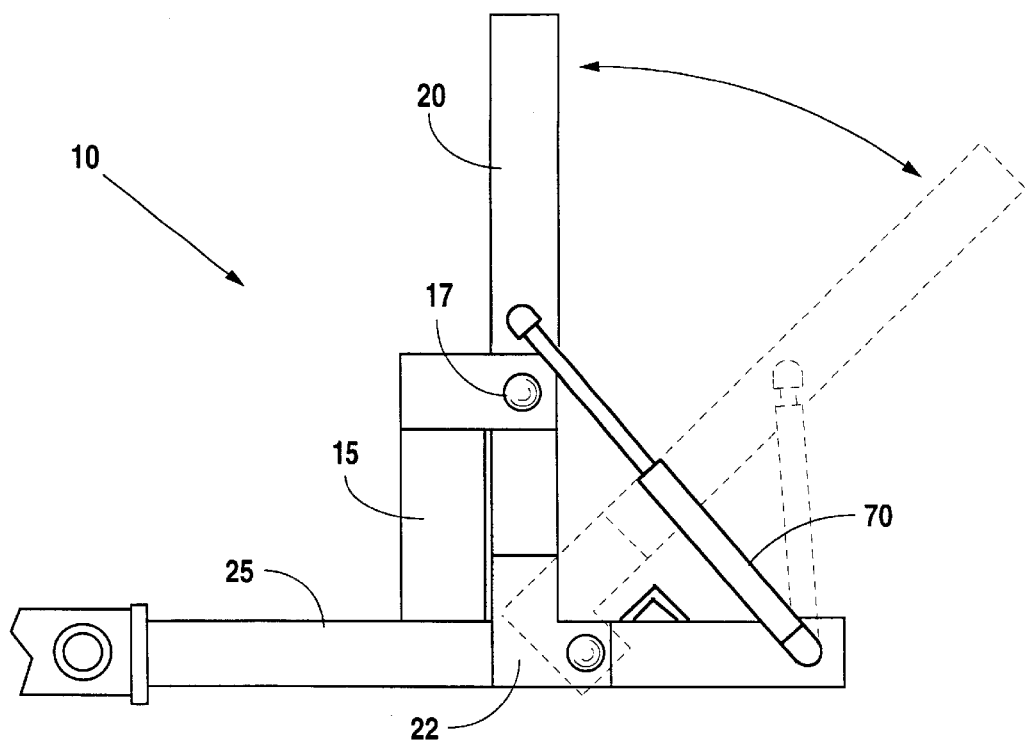
FIG. 3 is an elevational view of the base or mounting portion of the load carrier showing a backwardly pivoted orientation of the upright member in phantom.

Referring to FIG. 3, a typical construction of the base or mounting portion (10) of the load carrier (05) is illustrated. The inverted "T" shaped construction is clearly shown. Therein, a left end portion of a horizontal member (25) is configured for lockable insertion into a carrying vehicle's hitch receiver (03). A shorter upright post (15) is provided adjacent to the substantially longer upright carrying member (20) that is pivotally connected to the horizontal extension piece (25) from a carrying or transporting vehicle (02). A locking means in the form of an insertable pin through aligned apertures locks the upright member (20) in a substantially vertical configuration during transport. The pivotable connection between the upright or vertical member (20) and the horizontal extension piece (25) is accomplished by a pair of substantially "L" shaped flanges (22) that are joined to lateral sides of the upright member (20) and are pivotally connected to the horizontal extension member (25). Control for the pivotal movement of the upright member (20) is provided through a biasing member (70) such as the illustrated gas strut or shock. In the illustrated configuration of FIG. 3, the gas strut (70) is positioned to exert a compressive force and resist backward pivotation of the upright member (20). An alternative use of a biasing member (70) would be to locate it oppositely so that a tension force is exerted with the same effect being to urge the upright member (20) to a vertical orientation.

The gas strut (70) may also be viewed a redundant or secondary safety feature tending to maintain stability within the load carrier (05) even when the locking mechanism (17) intended to maintain the upright member (20) in a vertical orientation becomes disengaged.

Alternatively, the gas strut (70) of either of the above described or alternative configurations may be provided that control the movement of the upright member (20) between vertical and laid-back configurations.

In an alternatively configured biasing member (70), a force tending the upright member (20) to the vertical configuration is not continuously exerted.

Instead, a buffering force is exerted by the biasing member (70) upon the upright member (20) that prevents that member (20) from rapidly pivoting backward in a manner that could result in the application of abrupt and sharp forces to the load carrier (05) and the sport equipment piece (07) carried thereon.

Figure 1:
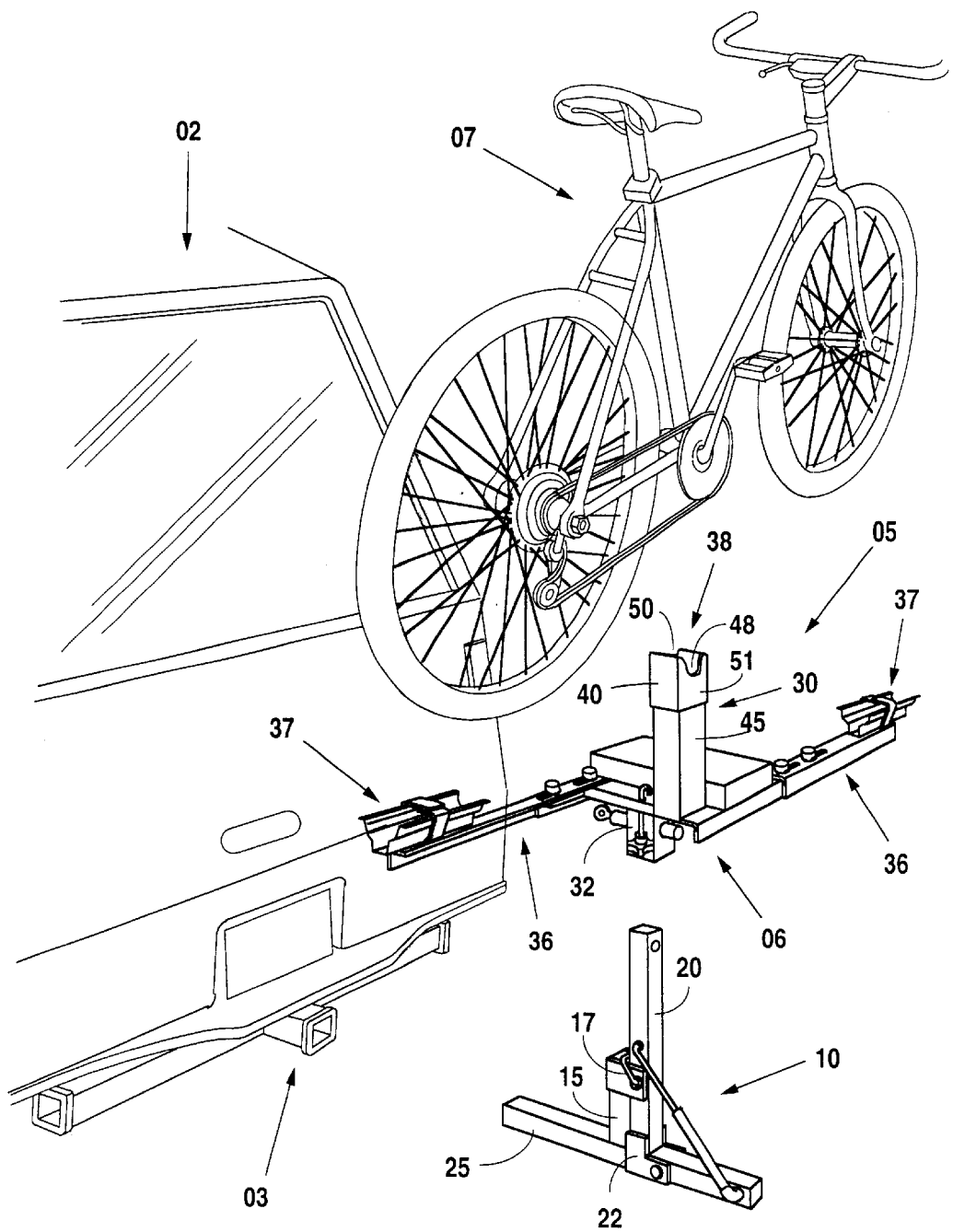
FIG. 1 is an exploded perspective view of a preferred embodiment of a load carrier and bicycle mounted at a hitch receiver upon a carrying vehicle.
Figure 2:
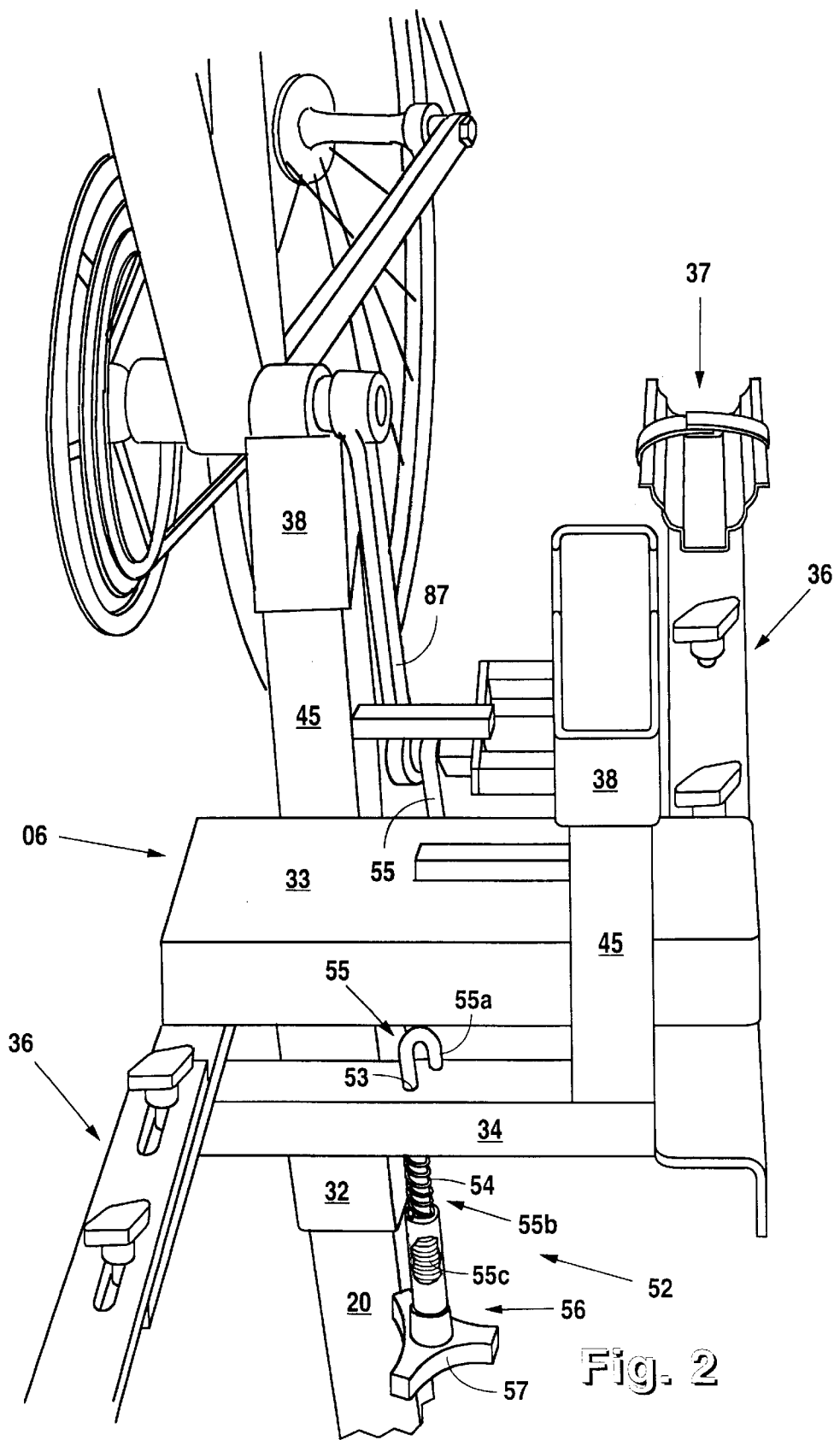
FIG. 2 is a perspective view of the J-shaped hook assembly for securing a bicycle to the load carrier.

Referring to FIGS. 1 and 2, a preferred embodiment of the bicycle carrying head piece (30) is illustrated. A downwardly projecting vertical member (32) is provided for engagement with the upright member (20) of the base portion (10) of the carrier (05). In one embodiment, the engagement between the two pieces would be as an insert within a sleeve between two end pieces wherein one is slightly smaller than the other thereby providing clearance therebetween and accommodating insertion of the smaller into the larger. Once this mating insertion is achieved, its orientation may be fixed by any suitable means such as an inserted bolt, fixing pin or locking bolt. Coming off of this vertical member (32) of the carrier head piece (30) is a horizontal support member (33) to which the balance of the carrier head (30) components are mounted.

Bicycle support members (38) are provided for receiving the bicycle pedal crank assembly (85) of a bicycle (07) to be carried thereon. Each support (38) has an engagement lip (50) that is preferably arc-shaped in a concave manner at an upper surface of a bicycle engaging portion (40) and into the top edge of the support (38). The created recess (48) into the support (38) is intended to engage the lower surface of the juncture of several pieces of the bicycle frame (80), or alternatively the axle (90) between the pedal crank arm of a bicycle pedal crank assembly (85) and the bicycle's frame (80). Regardless of the point of engagement, it is intended that the bicycle (07) be seated securely upon the upper surface engaging lip (50) of the bicycle support (38). To prevent damage to the carried bicycle (07), a buffer coating (51) or pad is supplied at the engaging points of contact at the top edge of the support (38). In a preferred embodiment and that which is illustrated, this buffer coating (51) is in the form of a rubber coating or a plastic coating that will not damage the painted surfaces of the bicycle frame.

Referring to FIG. 2, a securement mechanism (52) for the bicycle (07) to the load carrier (05) is accomplished through the utilization of J-shaped hooks (55) is illustrated for use in hooking about the bicycle pedal crank assembly (85) for securing that bicycle (07) to the carrier. The straight end portion (55b) of the J-hook (55) is threaded for insertion into receiving bolt apertures (53) in the frame (06) of the load carrier (05). In this instance, two horizontal brace pieces (34) are provided alongside the horizontal support member (33) and through which receiving apertures (53) are provided. As may be appreciated in FIG. 2, the lower threaded portion (55c) of the J-hook (55) may receive a stop knob or adjustment mechanism (56)that in the illustrated embodiment takes the form of an interiorly threaded tightening knob or nut (57) that assures that the hooked end portion (55a) is snugly tightened about the bicycle's pedal crank assembly (85) for secured upon the load carrier (05).

Under some conditions, the positioning of the bicycle (07) upon the upright support (38) may change thereby altering the relationship of the hooked end portion (55a) of the J-shaped hook (55) over the bicycle pedal crank assembly (85). After such an occurrence, it is possible for the initially snug fit to be loosened. This occurrence can be compensated for through the provision of a biasing member (54) between the end knob (57) and the insertion point of the J-shaped hook through the load carrier frame (06). By providing such a biasing member (54), for example a coiled spring, any slack that is introduced under the hooked end (55a) during transport can be taken up by the spring (54) to assure continuous securement and prevent inadvertent disengagement of the bicycle (07) from the load carrier (05).

Lateral extension arms (36) adjustably connected to the primary frame of the carrier head piece (30) are provided as illustrated in FIG. 1. In that embodiment, one extension arm (36) is provided for locating a tray (37) rightwardly of the backward extension frame member (33) of the load carrier (05). The tire receiving tray (37) is distally located upon the lateral extension arm (36) for receiving one of the tires of a carried bicycle (07). By providing such a supporting tray (37), two-point support is provided to the carried bicycle (07) resulting in stability of the mount. The connection of the lateral arm (36) is made adjustable in an exemplary manner by tightenable bolts through slots that interconnect the extension arm to the frame (06) of the load carrier (05). By providing this adjustability, variously sized bicycles may be accommodated and stabilized. Furthermore, by providing support to one wheel of the bicycle (07), support for the opposite wheel may be foregone. If added stability is desired, however, an additional extendable support such as the lateral arm (36) may be supplementally provided.

Figure 4:
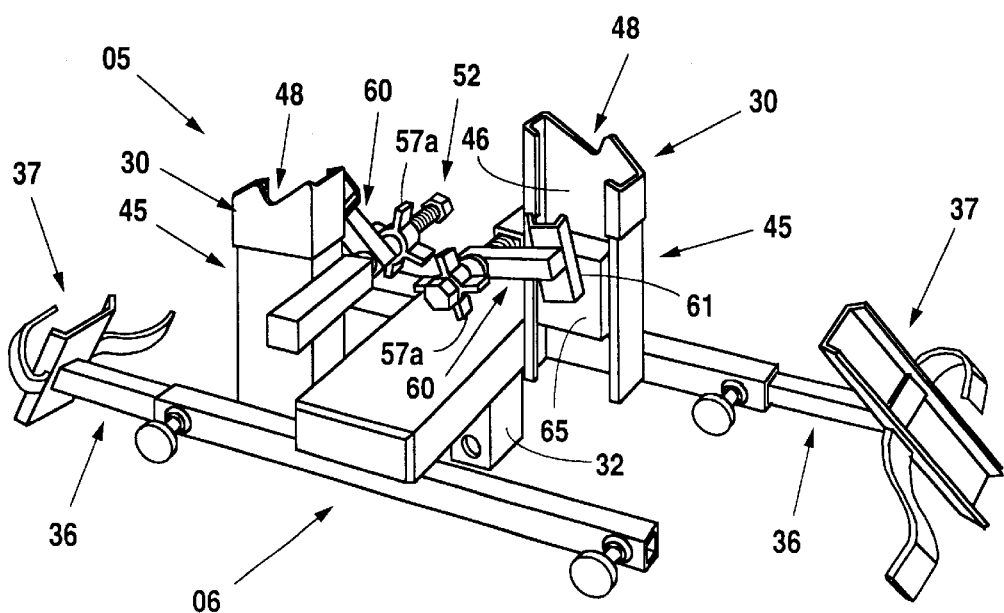
FIG. 4 is a perspective view of an alternative embodiment of the head piece in which the securement mechanism is a pivotal clamping mechanism that secures the bicycle pedal crank assembly to the load carrier.
Figure 5:
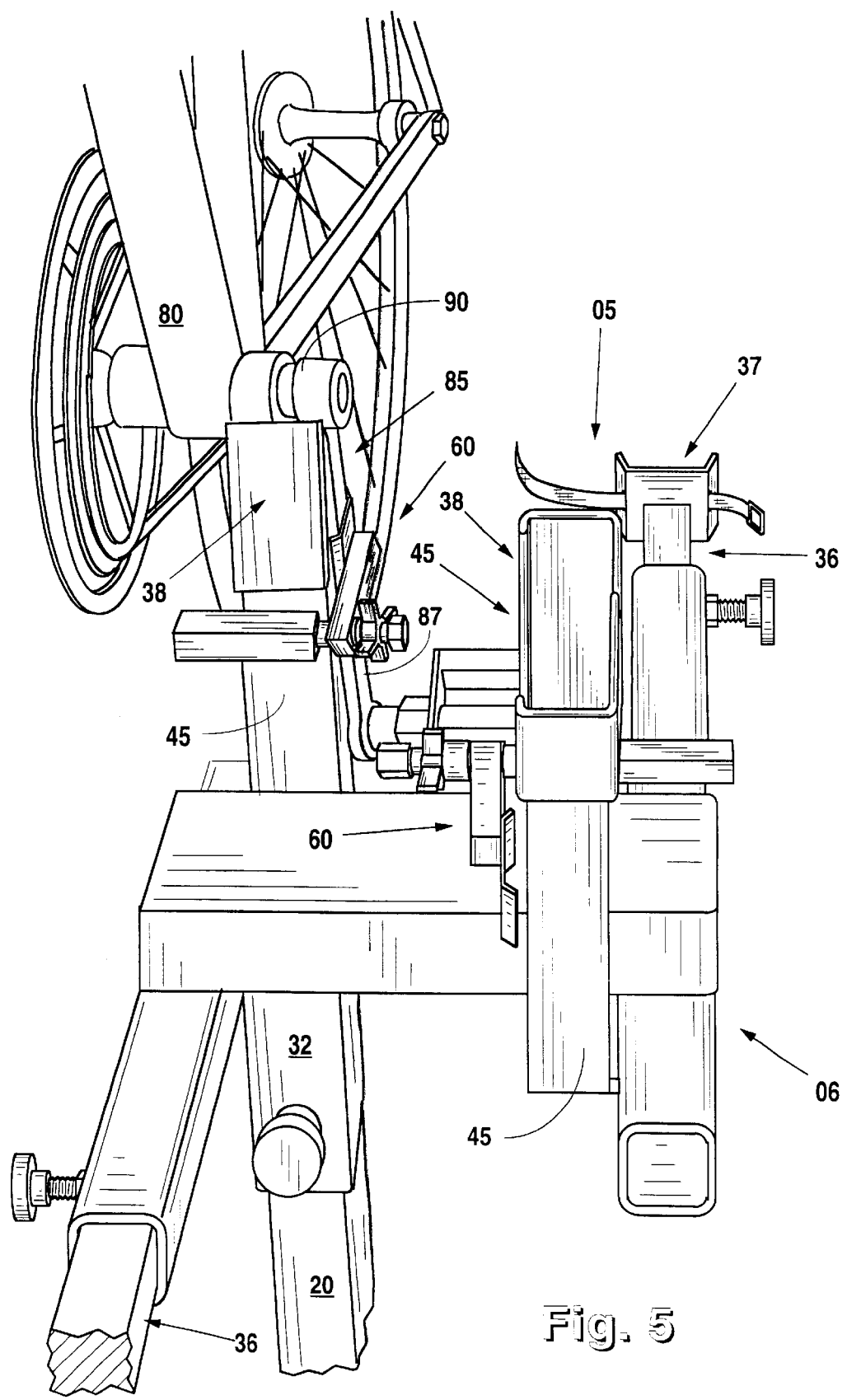
FIG. 5 is a perspective view of the pivotal clamping mechanism for securing a bicycle to the load carrier.

One configuration of the bicycle support (38) is illustrated in FIGS. 4 and 5 in the form of an upright open sleeve (45). The sleeve (45) is substantially tubularly shaped, but with a slotted opening on the backward facing side wall. In this manner, an interior space (46) of the sleeve (45) is formed that is accessible through an open top end and the elongate slotted opening. A pivotable clamping mechanism (60) is pivotable into a securing position in which an abutting portion (61) of the clamping mechanism (60) is placed for engagement upon a properly positioned bicycle pedal crank assembly (85) within the sleeve (45). A tightening nut or knob (57a) is provided exterior to the clamping piece (60) that when tightened causes the clamping member (60) to press against a portion of the bicycle pedal crank assembly (85) to accomplish securement within the sleeve (45). To permit the installation and removal of the bicycle pedal crank arm (87) within the sleeve (45), the clamping member (60) is pivoted out of the way so that the slotted opening is uncovered.

To properly position and protect the bicycle pedal crank assembly (85) while installed in the sleeve (45), buffering inserts or spacers (65) such as plastic blocks may be provided within the interior space (46). The spacers (65) serve to establish a proper position of the bicycle pedal crank assembly (85) within the sleeve (45) and to buffer metal-to-metal engagement between the bicycle pedal crank assembly (85) and the load carrier (05).

In at least one embodiment, the load carrier 05 includes a load carrier frame 06 adapted to be mounted atop a transport vehicle 02 and configured to carry a bicycle 07 thereupon in a substantially upright orientation. A securement mechanism 52 is pivotally coupled to the load carrier frame and adapted for engaging a bicycle pedal crank arm 87 of the bicycle 07 for securing the bicycle 07 upon the load carrier 05. A support tray 37 for at least one wheel of such a bicycle 07 is also carried upon the load carrier frame 06. The securement mechanism 52 includes a pivot arm constrained to pivotation about a horizontal axis that is substantially perpendicular to a lengthwise axis of a frame 80 of the bicycle 07 to be carried upon the load carrier frame 06. The securement mechanism further includes at least two members arranged to form an openable and closeable clasp that is adapted to be releasably engageable about a portion of the bicycle pedal crank arm 87. A first member of those two members is pivotable relative to a second member. Still further, the openable and closeable clasp is arranged so that in a closed configuration, the clasp is adapted to substantially surround or envelop a portion of the bicycle pedal crank arm 87 between the first and second members.

An extension head piece may be connected to the primary head piece (30) to provide additional carrying capacity to the load carrier (05). Such an extension head piece may be readily established through the utilization of head pieces substantially similar to those shown in FIGS. 1 and 2 and 4 and 5, but without the vertical member (32). A tapered horizontal extension member for insertable engagement into the open end of the horizontal support member (33) of the primary head piece (30) would also be preferably provided. In this way, one or more bicycles (07) may be added to the carrier (05) with the possibility for even further expansion with additional head pieces (30).

When such extension head pieces are added behind the primary carrier head (30) through the insertion of cooperating horizontal frame members, a secure connection is required not only for assuring that the several pieces remain together, but to also retain a sufficiently snug fit to prevent rattling and relative movement between the pieces. To facilitate insertion and accommodation of the extension piece, a buffering securement collar is provided between the mating pieces to fill the clearance space between the two members. By adding an additional point of connection at the opposite end, a secure and rattle free connection is accomplished.

Figures 6, 7:
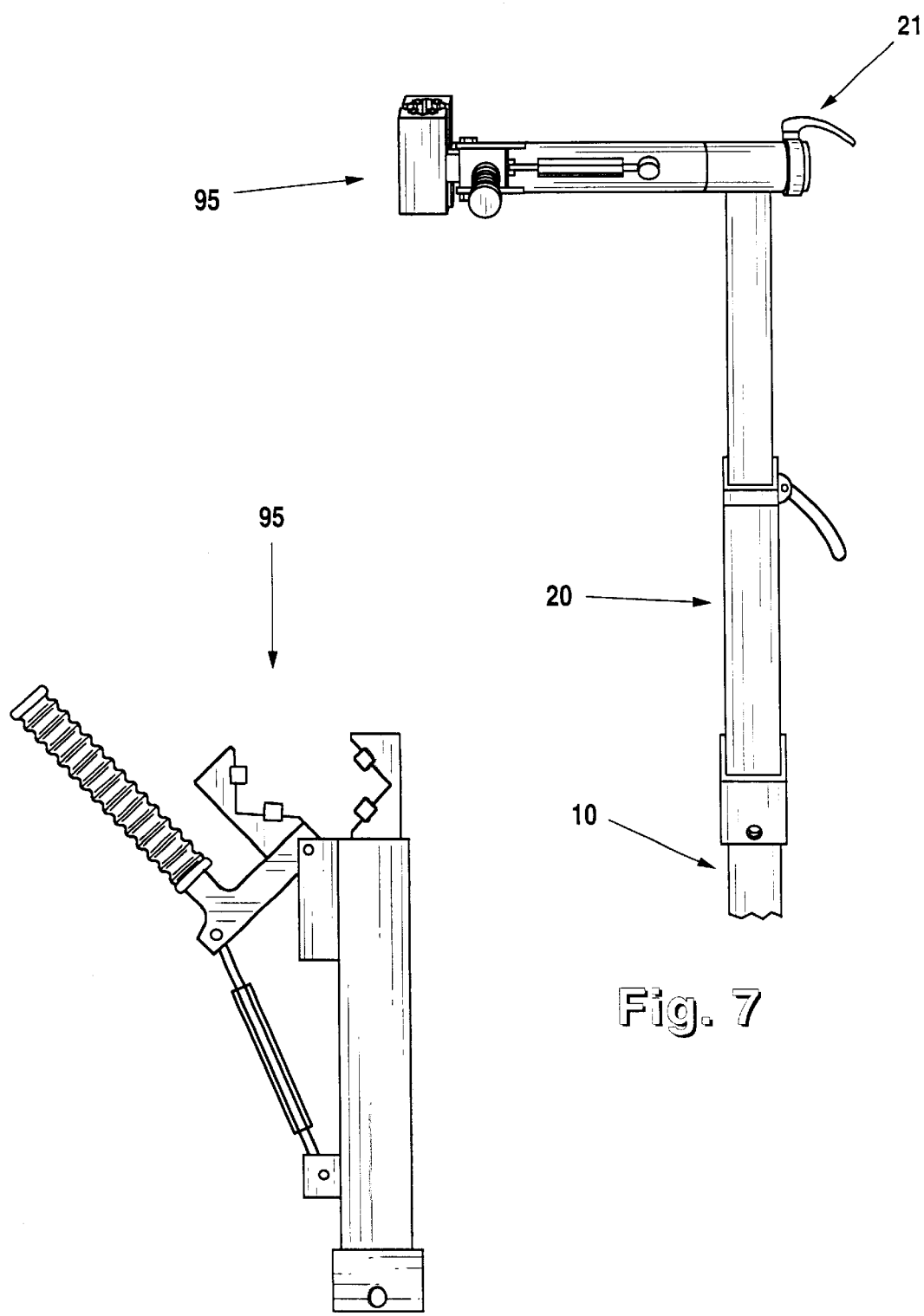
FIG. 6 is an elevational view of a lower mounting portion of the load carrier with a clamping head piece mounted thereon for typical use in bicycle repair procedures.
FIG. 7 illustrates an alternative mounting configuration for a clamping head piece that provides clasping capability for an upright or vertical member.

A supplemental utilization of the mounting portion of the lower mounting (10) is illustrated in FIGS. 6 and 7. Therein, a clamping head piece (95) is secured to the upright member (20) of the mounting portion. The securement between the two elements is accomplished by a tightening clamp (21) that is tightenable to an outer sleeve about an inserted end portion of the opposite member. While this is the illustrated means by which securement is achieved, it should be appreciated that any means for accomplishing a suitable connection would suffice.

The clamping action of the head piece (95) in this embodiment is achieved through an over-center configuration that permits an operator to manually move the clamp from an unclamped configuration into a clamping configuration that is maintained until released. A take-up piece is provided which is threaded at each of two ends that may be rotated to establish a specific distance between the lower pivot point at the upright member and the handle of the clamp. In this manner, the distance between the two clamping pieces, when in the clamped configuration, may be operator varied. The effect achieved is similar to that provided in a vice-grip tool.

Figure 8:
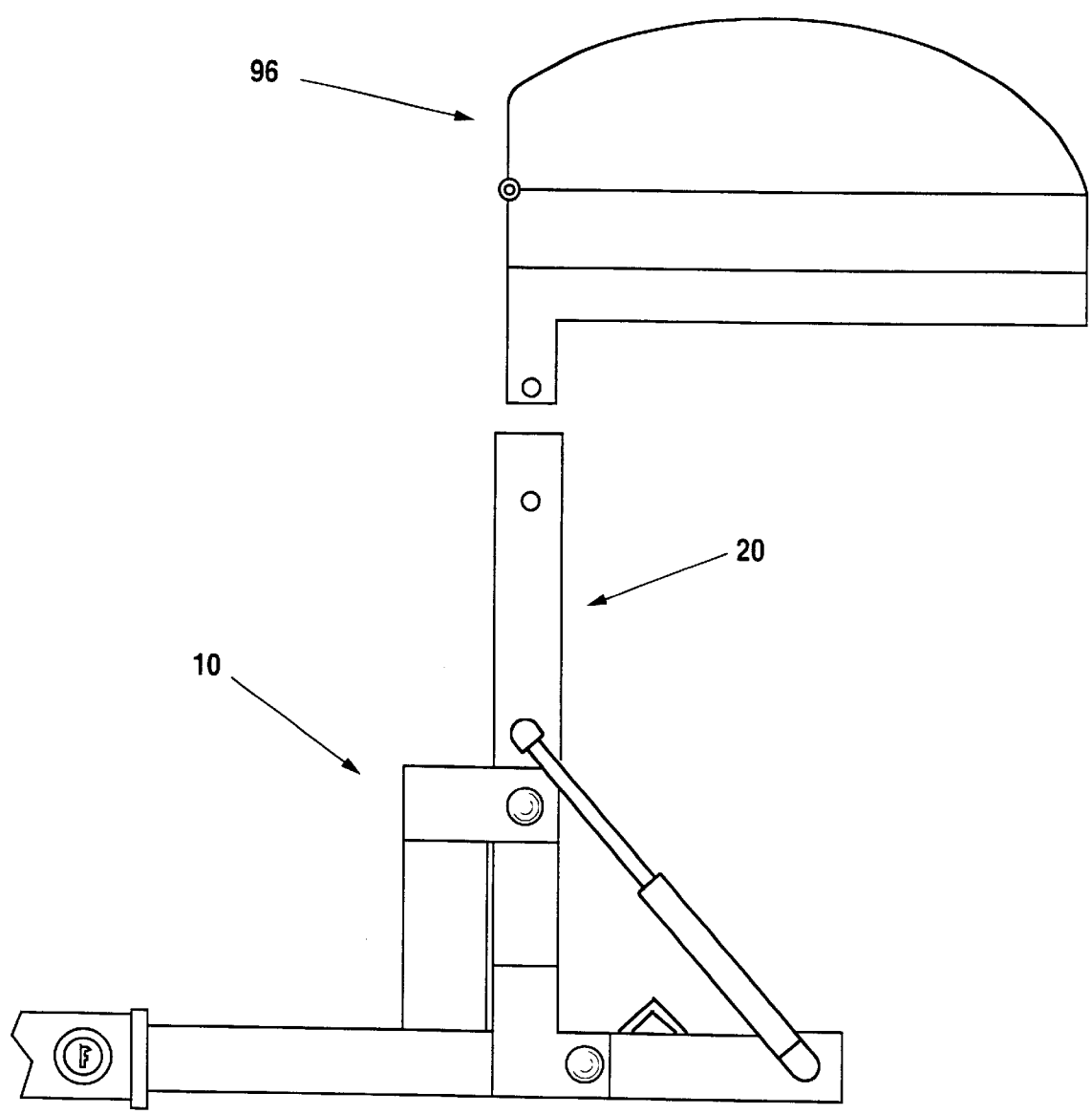
FIG. 8 is an elevational view of a lower base portion of the load carrier with a load carrying compartment head mountable thereon.

Further exemplifying the versatility of the constituent components of the present invention is the utilization of a cargo carrying compartment (96) as a head piece mounted upon the base portion (10) of the load carrier (05) as illustrated in FIG. 8. The cargo carrying compartment (96) may be of any conventional or new design that is adequately mounted on a frame system having a downwardly projecting member for secured installation upon the base or mounting portion (10).

Several different and alternative embodiments have been described herein above regarding components of a load carrier and specific configurations for carrying bicycles or accepting alternative head pieces such as a clasping clamp or cargo carrying compartments. Much of the attractiveness found in the carrier results from this versatility and ability to accommodate various needs and facilitate different applications regarding items to be transported upon a carrying vehicle.

INDUSTRIAL APPLICABILITY

The present invention finds applicability in the vehicular load carrier industries. The preferred embodiments find particular applicability in the sport equipment and bicycle carrier industry.

What is claimed and desired to be secured by Letters Patent is as follows:

1. A load carrier for a bicycle comprising:
   a load carrier frame adapted to be mounted to a transport vehicle;
   a bicycle support carried upon said load carrier frame, said bicycle support configured for engaging a bicycle at a position proximate a rotatable connection of a bicycle pedal crank assembly to a bicycle frame of the bicycle;
   a securement mechanism coupled to said load carrier frame and adapted for releasably engaging the bicycle pedal crank assembly of the bicycle for securing the bicycle upon said load carrier frame;
   said securement mechanism is a substantially J-shaped hook securable about the bicycle pedal crank assembly of the bicycle to be carried upon said load carrier, said J-shaped hook having a hooked end portion and a straight end portion;
   said substantially J-shaped hook is inserted in a hook aperture through a portion of said load carrier frame so that said hooked end portion of said J-shaped hook and said straight end portion of said J-shaped hook are on opposite sides of said load carrier frame portion at said hook aperture's location; and
   a resilient biasing member associated with said J-shaped hook for urging said hooked end portion toward said hook aperture.

2. The load carrier as recited in claim 1; further comprising:
   an adjustment mechanism for variably altering an effective length of said J-shaped hook between said hooked end portion and said straight end portion; and
   said biasing member being a compression spring located between said adjustment mechanism and said load carrier frame portion at said hook aperture.

3. The load carrier as recited in claim 1; wherein said J-shaped hook is at least partially threaded at said straight end portion opposite said hooked end portion; and
   a threaded adjustment mechanism for variably altering an effective length of said J-shaped hook between said threaded adjustment mechanism and said hooked end portion.

4. The load carrier as recited in claim 3; wherein said adjustment mechanism is a threaded knob threadedly engaged upon said threaded portion of said straight end portion of said J-shaped hook.

5. The load carrier as recited in claim 1; further comprising:
   a recess in an upper portion of said bicycle support for receiving the bicycle at a position proximate a rotatable connection of a bicycle pedal crank to a bicycle frame of the bicycle.

6. The load carrier as recited in claim 5; further comprising:

an upper surface of said recess being at least partially buffer coated for protecting a finish of an engaged bicycle.

7. The load carrier as recited in claim 1; further comprising:

a transport vehicle to which said load carrier frame is connected at a rear hitch mount assembly of said transport vehicle.

8. The load carrier as recited in claim 1; wherein said load carrier frame is adapted to be connected to the roof top of the transport vehicle.

9. A method for transporting a bicycle, said method comprising:

mounting a load carrier upon a transport vehicle;

installing a bicycle upon a bicycle support member of said load carrier by engaging said bicycle at a position proximate a rotatable connection of a bicycle pedal crank assembly to a bicycle frame of said bicycle;

releasably securing said bicycle to said load carrier utilizing a securement mechanism coupled to said load carrier by restraining said bicycle pedal crank assembly of said bicycle to said load carrier;

utilizing a substantially J-shaped hook for said restraint of said bicycle pedal crank assembly, said J-shaped hook having a hooked end portion and a straight end portion passing through a hook aperture in said load carrier; and providing a resilient biasing member associated with said J-shaped hook for urging said hooked end portion Toward said hook aperture.

10. The method as recited in claim 9; further comprising:

inserting said J-shaped hook through said aperture in said load carrier so that said hooked end portion of said J-shaped hook and said straight end portion of said J-shaped hook are on opposite sides of said load carrier at said aperture's location; and tightening a knob upon said straight end portion of said J-shaped hook so that said knob and said restrained bicycle pedal crank assembly are each drawn toward said load carrier at said aperture when said knob is advanced upon said straight end portion toward said hooked end portion.

11. A load carrier for a bicycle comprising:

a load carrier frame adapted to be mounted atop a transport vehicle and configured to carry a bicycle thereupon in a substantially upright orientation;

a securement mechanism coupled to said load carrier frame and adapted for engaging a bicycle pedal crank arm of a bicycle for securing the bicycle upon said load carrier frame;

said securement mechanism is a substantially J-shaped hook securable about the bicycle pedal crank assembly of the bicycle to be carried upon said load carrier, said J-shaped hook having a hooked end portion and a straight end portion;

said substantially J-shaped hook is inserted in a hook aperture through a portion of said load carrier frame so that said hooked end portion of said J-shaped hook and said straight end portion of said J-shaped hook are on opposite sides of said load carrier frame portion at said hook aperture's location such that said straight end portion is slidably positioned in said aperture; and a resilient biasing member associated with said J-shaped hook for urging said hooked end portion toward said hook aperture; and a support tray for at least one wheel of a bicycle to be carried upon said load carrier frame.

12. The load carrier as recited in claim 11; further comprising:

an adjustment mechanism for variably altering an effective length of said J-shaped hook between said hooked end portion and said straight end portion; and said biasing member being a compression spring located between said adjustment mechanism and said load carrier frame portion at said hook aperture.

13. The load carrier as recited in claim 11; wherein said J-shaped hook is at least partially threaded at said straight end portion opposite said hooked end portion; and a threaded adjustment mechanism for variably altering an effective length of said J-shaped hook between said threaded adjustment mechanism and said hooked end portion.

14. The load carrier as recited in claim 13; wherein said adjustment mechanism is a threaded knob threadedly engaged upon said threaded portion of said straight end portion of said J-shaped hook.

15. The load carrier as recited in claim 11; further comprising:

a recess in an upper portion of said bicycle support for receiving a bicycle at a position proximate a rotatable connection of a bicycle pedal crank to a bicycle frame of the bicycle.

16. The load carrier as recited in claim 15; further comprising:

an upper surface of said recess being at least partially buffer coated for protecting a finish of an engaged bicycle.

* * * * *